US008164790B2

(12) United States Patent
Ng et al.

(10) Patent No.: US 8,164,790 B2
(45) Date of Patent: Apr. 24, 2012

(54) METHODS OF REDUCING GRAIN AND TEXTURE IN A PRINTED IMAGE

(75) Inventors: Yee S. Ng, Rochester, NY (US); Mamie Kam Ng, legal representative, Fairport, NY (US); Hwai-Tzuu Tai, Rochester, NY (US); Peter S. Alexandrovich, Rochester, NY (US); Chung-Hui Kuo, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 549 days.

(21) Appl. No.: 12/398,250

(22) Filed: Mar. 5, 2009

(65) Prior Publication Data

US 2010/0224090 A1 Sep. 9, 2010

(51) Int. Cl.
*H04N 1/60* (2006.01)

(52) U.S. Cl. .......... 358/1.9; 358/406; 358/504; 358/463

(58) Field of Classification Search .................. 358/1.9, 358/2.1, 3.26, 406, 463, 504, 515, 518, 521; 382/162, 167; 347/7, 43, 85, 98

See application file for complete search history.

(56) References Cited

U.S. PATENT DOCUMENTS 6,178,008 B1 1/2001 Bockman et al.
6,183,071 B1 * 2/2001 Sugimoto et al. ............... 347/85
6,435,657 B1 * 8/2002 Couwenhoven et al. ....... 347/43
6,765,693 B1 7/2004 Chang
6,906,825 B1 6/2005 Nakahara et al.
6,996,358 B2 2/2006 Ayaki et al.
7,382,493 B2 * 6/2008 Takahashi ...................... 358/1.9
7,564,604 B2 * 7/2009 Shirasawa ..................... 358/529
7,945,178 B2 * 5/2011 Toyohara ........................ 399/49
2005/0018222 A1 * 1/2005 Yoshida ......................... 358/1.9
2005/0024660 A1 * 2/2005 Takahashi ...................... 358/1.9
2005/0140997 A1 * 6/2005 Shirasawa ...................... 358/1.9
2006/0133870 A1 6/2006 Ng et al.
2008/0107434 A1 * 5/2008 Toyohara ........................ 399/62
2010/0092215 A1 * 4/2010 Veregin et al. ................ 399/223
2011/0182608 A1 * 7/2011 Toyohara ........................ 399/72

* cited by examiner

*Primary Examiner* — Kimberly A Williams

(74) *Attorney, Agent, or Firm* — William R. Zimmerli; Christopher J. White

(57) ABSTRACT

Methods of improving image quality by reducing grain and texture in a printed image are provided. According to one embodiment, a method of reducing grain and texture in an image includes the steps of providing a light color toner and a dark color toner, providing an aperiodic micrononuniformity map, using the aperiodic micrononuniformity map to determine an acceptable domain that includes a plurality of combinations of the light color toner and the dark color toner, and forming an image by selecting one combination of the light color toner and the dark color toner from the plurality of combinations of the light color toner and the dark color toner.

7 Claims, 9 Drawing Sheets

UNCONSTRAINED REPLACEMENT CURVES FOR LIGHT MAGENTA

CONSTRUCTED LUT FOR HYPOTHETICAL COLOR

| HYPOTHETICAL COLOR | LIGHT COLOR | DARK COLOR |
|---|---|---|
| 0% | 0% | 0% |
| 5% | 18% | 0% |
| 30% | 50% | 0% |
| — | — | — |
| 50% | 95% | 10% |
| — | — | — |
| 90% | 100% | 80% |
| 100% | 100% | 100% |

METHODS OF REDUCING GRAIN AND TEXTURE IN A PRINTED IMAGE

FIELD OF THE INVENTION

This invention relates generally to electrographic printing, and in particular to methods of reducing grain and texture in a printed image.

BACKGROUND OF THE INVENTION

Current printing system typically use 4 colorants to compose color images, i.e. cyan, magenta, yellow and black. Among them, cyan, magenta and yellow can be denoted as primary colors because they can theoretically cover the entire printer color gamut. Black is further introduced to improve the stability of neutral rendition. The size of the achievable color gamut is determined by the chromaticity/saturation of the primary colors. As a result, a set of primary colors with higher saturation is able to produce more colorful images, which in turn are more preferred by viewers. However, all printing processes have their intrinsic noise, and it will manifest into various macroscopic and microscopic artifacts, such as granularity and mottle.

Researchers have found that, under the same printing noise environment, the perceived graininess is proportional to the luminance contrast of selected colorants (see Chung-Hui Kuo, Yee Ng, and Di Lai, Grain Profile of a Printing System, IS&T NIP23, September 2007). As a result, the manufacturers of printing presses have to strike a balance between the size of the color gamut and severity of granularity.

Generally there exist two approaches to address this issue: improve the printing process noise, and/or augment the current printing process with extra light color(s) with lower pigment concentration (See Chingwei Chang, U.S. Pat. No. 6,765,693, July 2004; and Yasukazu Ayaki, Takeshi Ikeda, Yukio Nagase, Nobuyuki Itoh, Isami Itoh, and Tomohito Ishida, U.S. Pat. No. 6,996,358, February 2006). An advantage of introducing supplemental light color(s) into a printing process is that it improves the color resolution capability so as to reduce possible color contouring problems. However, granularity is still a problem especially when there is a lower percentage coverage of color separation with current 8 micrometer toner. Even with smaller particle toners (such as 6 micrometer toners), variation in transfer efficiency with low coverage causes higher grain, especially in photo-rich applications that may involve enhanced gloss.

U.S. Pat. No. 6,906,825 to Nakahara et al. describes a halftone processing section that halftone-processes input image data using a plurality of dither threshold planes. An image output section having different output position accuracies between a main scan direction and a sub-scan direction outputs an image corresponding to halftone-processed image data. Each of the dither threshold planes consists of a plurality of the same unit threshold matrixes. In the unit threshold matrix, a relatively medium to high threshold array in a predetermined threshold range corresponding to the entire tone range of the input image data is an aperiodic array and an anisotropic array with neighboring thresholds having close values, in a direction coincident with a scan direction, in which the output position accuracy of the image output means is low. With this configuration, the image output section outputs an image having serial medium and high tone dots in the scan direction.

U.S. Pat. No. 6,178,008 to Bockman et al. describes an automatic system that forms color LUTs (or LUT-forming data) for automated reference—typically in error diffusion (ED). A first aspect is for printers with six or more colorants. Three ramps, for different basic colorants, are photometrically measured; mainly just those results yield a transform from 3D color to system colorants. In a second aspect, some device-state candidate colors are chosen for black replacement. In a variant the choice is subject to (1) maintaining some chromatic colorant in each pixel with black; or (2) modifying use patterns to avoid alternative use of composite black vs. black; or (3) adjustments to allow for composite nonequivalence to black. A related third aspect allows replacement only if there is a given minimum amount of composite. In a fourth aspect, candidate states are dropped that have small changes in number of quanta per pixel, or no companion light colorant quantum with each dark one, best eliminating those with too many quanta of each or all colorants. In a related fifth aspect, one state is assigned to each major entry based on, at a gamut surface except at the dark end, favoring states nearer the surface over those nearer a desired major entry; and at the neutral axis, especially its dark end, favoring real black. Other assigning is best done by entry nearness. In a sixth aspect preferably 1D LUTs are formed for finding major entries based on an input-color spec, not monotonic in entry assignment to indices; precomputed ED distributions attach to indices. In a seventh aspect a state LUT formed to access states based on input specs is used to print nominal neutral colors and measured results used to adjust access. In an eighth facet related to the first, the ramps correspond to fundamental combinations of single colorants, e. g. secondaries.

SUMMARY OF THE INVENTION

The present invention contemplates methods of improving image quality by reducing grain and texture in a printed image.

According to one aspect of the present invention, a method for enhancing image quality that is controlled by the measured granularity profile of the targeted printing press is provided. The present invention can be easily extended to any of the available auxiliary light colorants.

According to another aspect of the present invention, a method of reducing grain and texture in an image includes the steps of providing a light color toner and a dark color toner, providing an aperiodic microuniformity map, using the aperiodic micrononuniformity map to determine an acceptable domain that includes a plurality of combinations of the light color toner and the dark color toner, and forming an image by selecting one combination of the light color toner and the dark color toner from the plurality of combinations of the light color toner and the dark color toner.

According to another aspect of the present invention, a method of improving the print quality of a printer includes the steps of classifying the colors to be used as primary or auxiliary; characterizing the color and graininess of the colors; analyzing the colors with Primary→Auxiliary Color Replacement Optimization Process; and replacing the original colorant combination.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

For simplicity and illustrative purposes, the principles of the present invention are described by referring to various exemplary embodiments thereof. Although the preferred embodiments of the invention are particularly disclosed herein, one of ordinary skill in the art will readily recognize that the same principles are equally applicable to, and can be implemented in other systems, and that any such variation would be within such modifications that do not part from the scope of the present invention. Before explaining the disclosed embodiments of the present invention in detail, it is to be understood that the invention is not limited in its application to the details of any particular arrangement shown, since the invention is capable of other embodiments. The terminology used herein is for the purpose of description and not of limitation. Further, although certain methods are described with reference to certain steps that are presented herein in certain order, in many instances, these steps may be performed in any order as would be appreciated by one skilled in the art, and the methods are not limited to the particular arrangement of steps disclosed herein.

The present invention provides a method of reducing grain and texture in an image including the steps of providing a light color toner and a dark color toner, providing an aperiodic micrononuniformity map, using the aperiodic micrononuniformity map to determine an acceptable domain that includes a plurality of combinations of the light color toner and the dark color toner, and forming an image by selecting one combination of the light color toner and the dark color toner from the plurality of combinations of the light color toner and the dark color toner. The possible light-colorant configurations in accordance with the instant invention are discussed below based on the five-module imaging process currently incorporated in a Kodak NexPress printing press; nonetheless, this invention can be easily extended to other multi-module extension configurations.

Figure 1:
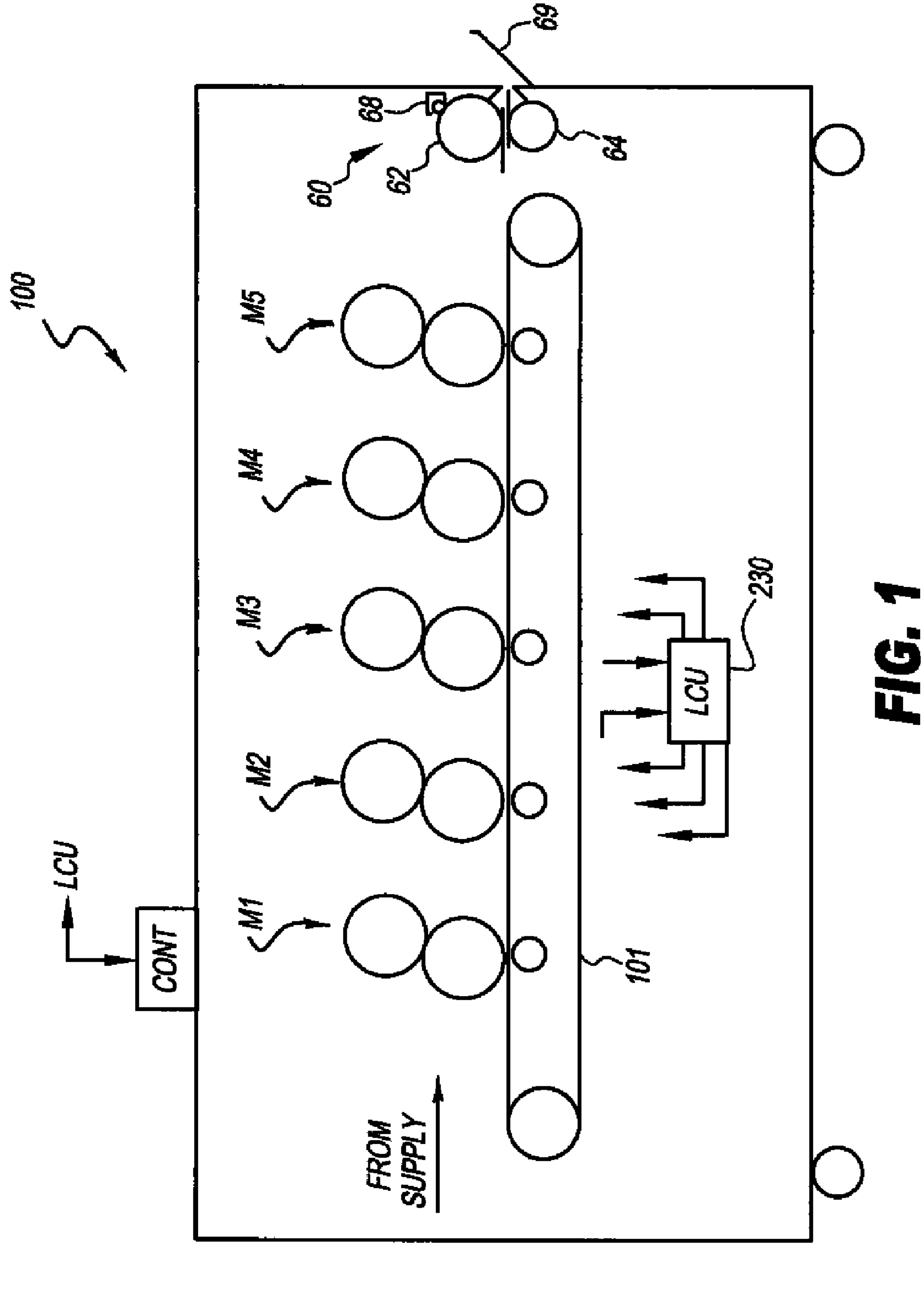
FIG. 1 is a schematic side elevational view, in cross section, of a typical electrographic reproduction apparatus suitable for use with this invention.
Figure 2:
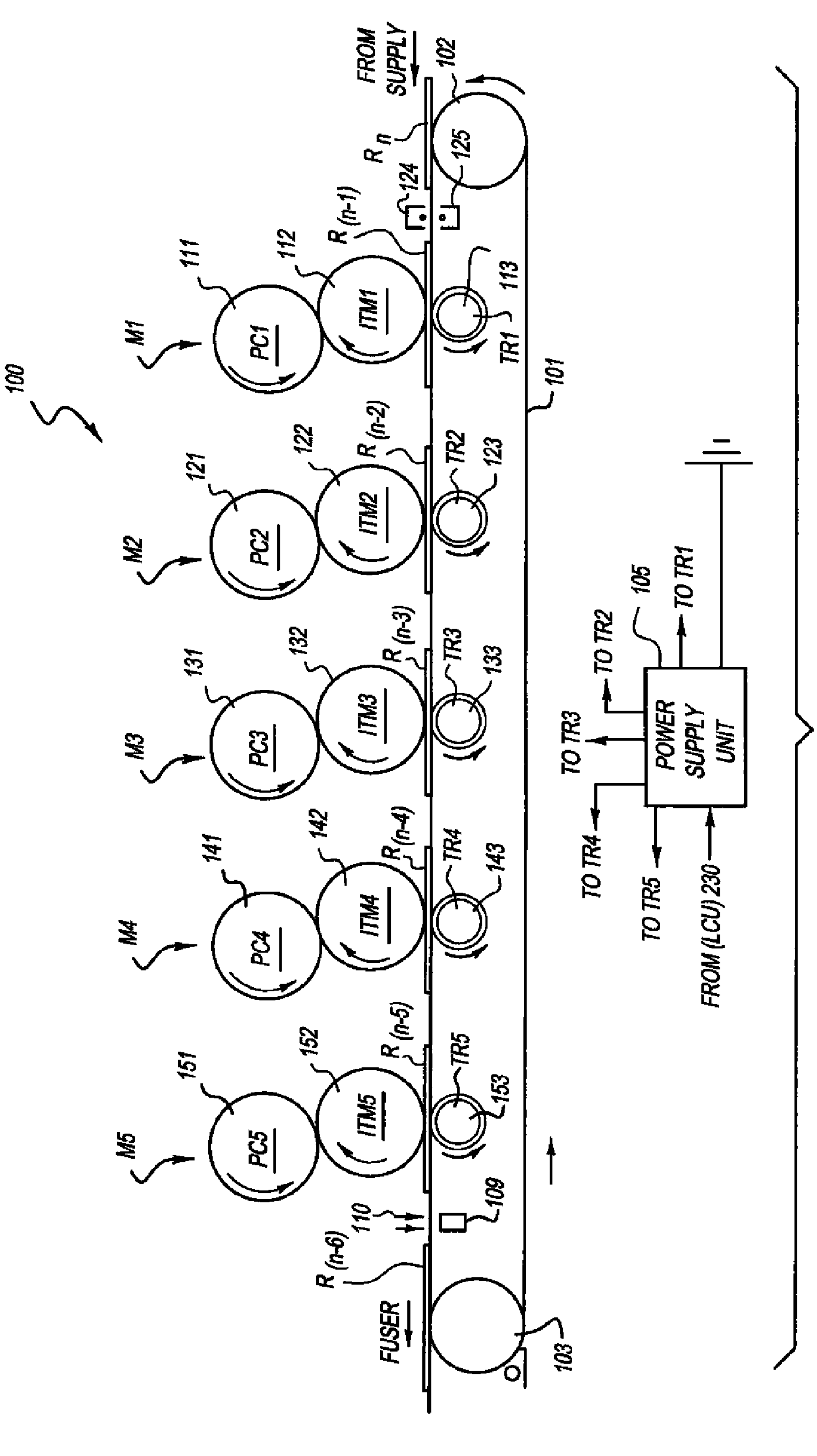
FIG. 2 is a schematic side elevational view, in cross section, of the reprographic image-producing portion of the electrographic reproduction apparatus of FIG. 1, on an enlarged scale.
Figure 3:
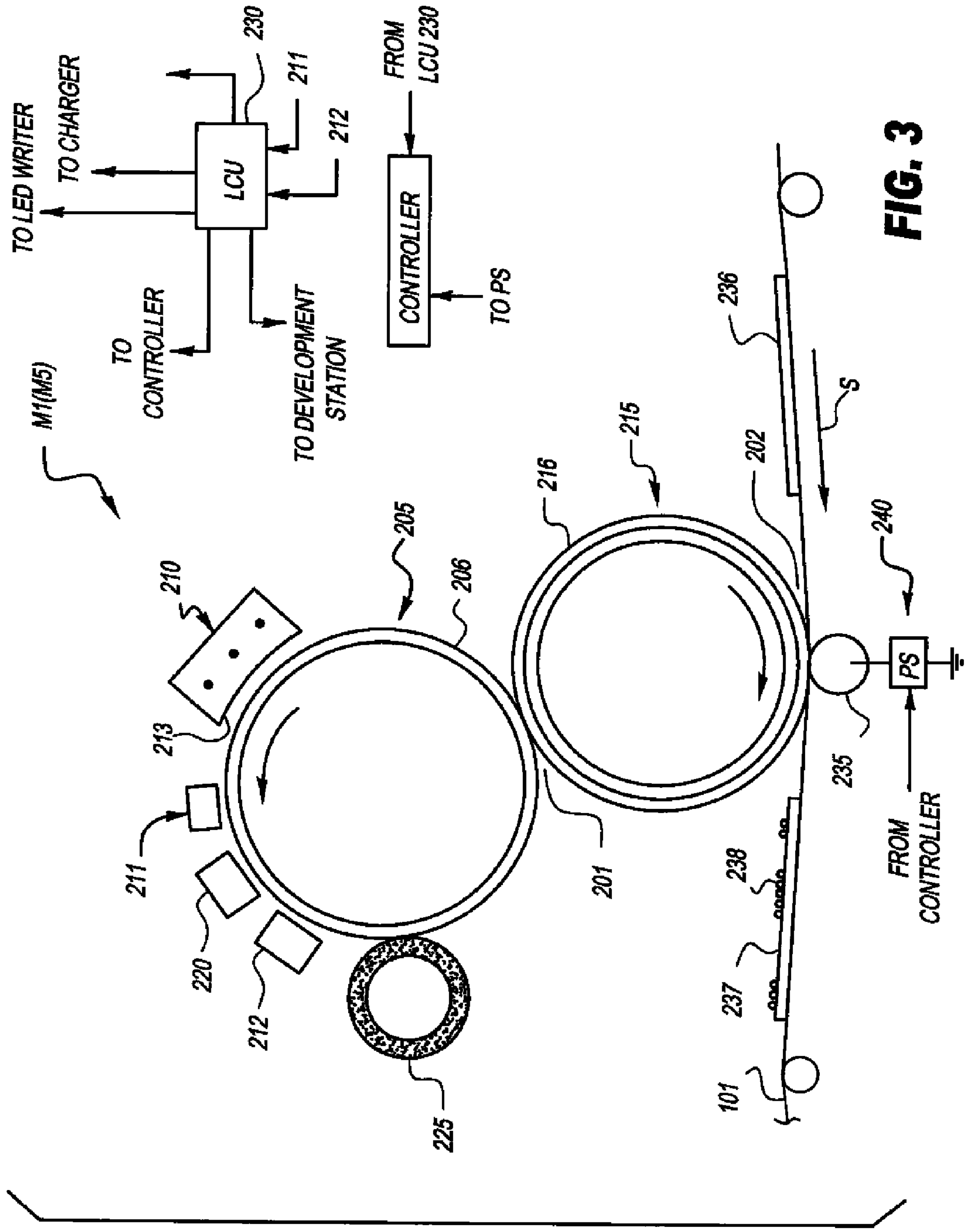
FIG. 3 is a schematic side elevational view, in cross section, of one printing module of the electrographic reproduction apparatus of FIG. 1, on an enlarged scale.

Referring now to the accompanying drawings, FIGS. 1-3 are side elevational views schematically showing portions of a typical electrographic print engine or printer apparatus suitable for printing of pentachrome images. Although one embodiment of the invention involves printing using an electrophotographic engine having five sets of single color image producing or printing stations or modules arranged in tandem, the invention contemplates that more or less than five colors may be combined on a single receiver member, or may include other typical electrographic writers or printer apparatus.

An electrographic printer apparatus 100 has a number of tandemly arranged electrostatographic image forming printing modules M1, M2, M3, M4, and M5. Each of the printing modules generates a single-color toner image for transfer to a receiver member successively moved through the modules. Each receiver member, during a single pass through the five modules, can have transferred in registration thereto up to five single-color toner images to form a pentachrome image. As used herein the term pentachrome implies that in an image formed on a receiver member combinations of subsets of the five colors are combined to form other colors on the receiver member at various locations on the receiver member, and that all five colors participate to form process colors in at least some of the subsets wherein each of the five colors may be combined with one or more of the other colors at a particular location on the receiver member to form a color different than the specific color toners combined at that location. In a particular embodiment, printing module M1 forms black (K) toner color separation images, M2 forms yellow (Y) toner color separation images, M3 forms magenta (M) toner color separation images, and M4 forms cyan (C) toner color separation images. Printing module M5 may form a red, blue, green or other fifth color separation image. It is well known that the four primary colors cyan, magenta, yellow, and black may be combined in various combinations of subsets thereof to form a representative spectrum of colors and having a respective gamut or range dependent upon the materials used and process used for forming the colors. However, in the electrographic printer apparatus, a fifth color can be added to improve the color gamut. In addition to adding to the color gamut, the fifth color may also be used as a specialty color toner image, such as for making proprietary logos, or a clear toner for image protective purposes.

Receiver members (Rn-$R_{(n-6)}$ as shown in FIG. 2) are delivered from a paper supply unit (not shown) and transported through the printing modules M1-M5. The receiver members are adhered (e.g., preferably electrostatically via coupled corona tack-down chargers 124, 125) to an endless transport web 101 entrained and driven about rollers 102, 103. Each of the printing modules M1-M5 similarly includes a photoconductive imaging roller, an intermediate transfer member roller, and a transfer backup roller. Thus in printing module M1, a black color toner separation image can be created on the photoconductive imaging roller PC1 (111), transferred to intermediate transfer member roller ITM1 (112), and transferred again to a receiver member moving through a transfer station, which transfer station includes ITM1 forming a pressure nip with a transfer backup roller TR1 (113). Similarly, printing modules M2, M3, M4, and M5 include, respectively: PC2, ITM2, TR2 (121, 122, 123); PC3, ITM3, TR3 (131, 132, 133); PC4, ITM4, TR4 (141, 142, 143); and PC5, ITM5, TR5 (151, 152, 153). A receiver member, $R_n$, arriving from the supply, is shown passing over roller 102 for subsequent entry into the transfer station of the first printing module, M1, in which the preceding receiver member $R_{(n-1)}$ is shown. Similarly, receiver members $R_{(n-2)}$, $R_{(n-3)}$, $R_{(n-4)}$, and $R_{(n-5)}$ are shown moving respectively through the transfer stations of printing modules M2, M3, M4, and M5. An unfused image formed on receiver member $R_{(n-6)}$ is moving as shown towards a fuser of any well known construction, such as the fuser assembly 60 (shown in FIG. 1).

A power supply unit 105 provides individual transfer currents to the transfer backup rollers TR1, TR2, TR3, TR4, and TR5 respectively. A logic and control unit 230 (FIG. 1) includes one or more computers and in response to signals from various sensors associated with the electrophotographic printer apparatus 100 provides timing and control signals to the respective components to provide control of the various components and process control parameters of the apparatus in accordance with well understood and known employments. A cleaning station 101*a* for transport web 101 is also typically provided to allow continued reuse thereof.

With reference to FIG. 3 wherein a representative printing module (e.g., M1 of M1-M5) is shown, each printing module of the electrographic printer apparatus 100 includes a plurality of electrographic imaging subsystems for producing a single color toned image. Included in each printing module is a primary charging subsystem 210 for uniformly electrostatically charging a surface 206 of a photoconductive imaging member (shown in the form of an imaging cylinder 205). An exposure subsystem 220 is provided for image-wise modulating the uniform electrostatic charge by exposing the photoconductive imaging member to form a latent electrostatic color separation image of the respective color. A development station subsystem 225 serves for toning the image-wise exposed photoconductive imaging member with toner of a respective color. An intermediate transfer member 215 is provided for transferring the respective color separation image from the photoconductive imaging member through a transfer nip 201 to the surface 216 of the intermediate transfer member 215 and from the intermediate transfer member 215 to a receiver member (receiver member 236 shown prior to entry into the transfer nip and receiver member 237 shown subsequent to transfer of the toned color separation image) which receives the respective toned color separation images in superposition to form a composite multicolor image thereon.

Subsequent to transfer of the respective color separation images, overlaid in registration, one from each of the respective printing modules M1-M5, the receiver member is advanced to a fusing assembly to fuse the multicolor toner image to the receiver member. Additional necessary components provided for control may be assembled about the various process elements of the respective printing modules (e.g., a meter 211 for measuring the uniform electrostatic charge, a meter 212 for measuring the post-exposure surface potential within a patch area of a patch latent image formed from time to time in a non-image area on surface 206, etc). Further details regarding the electrographic printer apparatus 100 are provided in U.S. Publication No. 2006/0133870, published on Jun. 22, 2006, in the names of Yee S. Ng et al.

Associated with the printing modules 200 is a main printer apparatus logic and control unit (LCU) 230, which receives input signals from the various sensors associated with the printer apparatus and sends control signals to the chargers 210, the exposure subsystem 220 (e.g., LED writers), and the development stations 225 of the printing modules M1-M5. Each printing module may also have its own respective controller coupled to the printer apparatus main LCU 230.

Subsequent to the transfer of the five color toner separation images in superposed relationship to each receiver member, the receiver member is then serially de-tacked from transport web 101 and sent in a direction to the fusing assembly 60 to fuse or fix the dry toner images to the receiver member. The transport web is then reconditioned for reuse by cleaning and providing charge to both surfaces 124, 125 (see FIG. 2) which neutralizes charge on the opposed surfaces of the transport web 101.

The electrostatic image is developed by application of pigmented marking particles (toner) to the latent image bearing photoconductive drum by the respective development station 225. Each of the development stations of the respective printing modules M1-M5 is electrically biased by a suitable respective voltage to develop the respective latent image, which voltage may be supplied by a power supply or by individual power supplies (not illustrated). Preferably, the respective developer is a two-component developer that includes toner marking particles and magnetic carrier particles. Each color development station has a particular color of pigmented toner marking particles associated respectively therewith for toning. Thus, each of the five modules creates a different color marking particle image on the respective photoconductive drum. As will be discussed further below, a non-pigmented (i.e., clear) toner development station may be substituted for one of the pigmented developer stations so as to operate in similar manner to that of the other printing modules, which deposit pigmented toner. The development station of the clear toner printing module has toner particles associated respectively therewith that are similar to the toner marking particles of the color development stations but without the pigmented material incorporated within the toner binder.

With further reference to FIG. 1, transport belt 101 transports the toner image carrying receiver members to a fusing or fixing assembly 60, which fixes the toner particles to the respective receiver members by the application of heat and pressure. More particularly, fusing assembly 60 includes a heated fusing roller 62 and an opposing pressure roller 64 that form a fusing nip there between. Fusing assembly 60 also includes a release fluid application substation generally designated 68 that applies release fluid, such as, for example, silicone oil, to fusing roller 62. The receiver members carrying the fused image are transported seriatim from the fusing assembly 60 along a path to either a remote output tray, or returned to the image forming apparatus to create an image on the backside of the receiver member (form a duplex print).

The logic and control unit (LCU) 230 includes a microprocessor incorporating suitable look-up tables and control software, which is executable by the LCU 230. The control software is preferably stored in memory associated with the LCU 230. Sensors associated with the fusing assembly provide appropriate signals to the LCU 230. In response to the sensors, the LCU 230 issues command and control signals that adjust the heat and/or pressure within fusing nip 66 and otherwise generally nominalizes and/or optimizes the operating parameters of fusing assembly 60 for imaging substrates.

Image data for writing by the printer apparatus 100 may be processed by a raster image processor (RIP), which may include a color separation screen generator or generators. The output of the RIP may be stored in frame or line buffers for transmission of the color separation print data to each of respective LED writers K, Y, M, C, and R (which stand for black, yellow, magenta, cyan, and red respectively and assuming that the fifth color is red). The RIP and/or color separation screen generator may be a part of the printer apparatus or remote therefrom. Image data processed by the RIP may be obtained from a color document scanner or a digital camera or generated by a computer or from a memory or network which typically includes image data representing a continuous image that needs to be reprocessed into halftone image data in order to be adequately represented by the printer. The RIP may perform image processing processes including color correction, etc. in order to obtain the desired color print. Color image data is separated into the respective colors and converted by the RIP to halftone dot image data in the respective color using matrices, which comprise desired screen angles and screen rulings. The RIP may be a suitably programmed computer and/or logic devices and is adapted to employ stored or generated matrices and templates for processing separated color image data into rendered image data in the form of halftone information suitable for printing.

For granularity problems relating to memory colors such as a human face and light blue sky, a printing module containing light magenta is a preferred choice. For other important colors, other lighter fifth colors such as light cyan, and light black may be substituted. For post-finishing gloss enhancement purposes, a glosser with a clear toner coating input may be used. A two-pass process may also be used. That is, a second pass through the printing press for application of the Clear Dry Ink after the light color and the four basic process colors have been used in the first pass. Several problems arose that had to be solved to accomplish this task:

1) The merging of the two similar colors of different pigment concentration. For example one toner has a maximum magenta density of 0.7 or less, and a 2nd magenta toner that has a maximum density of 1.45 or more, to avoid tone reversal in the transition region. Digital blending of the two toners is the solution to avoid abrupt change. At low magenta coverage, lighter magenta is used. In mid coverage region, blending of lighter magenta and darker magenta occurs. At high coverage, more darker magenta is used to maintain the total toner mass to be reasonable for fusing, that is, one can still keep the maximal total colorant coverage to 280%-320% for the 5 color system.

2) Avoiding the possible interference of the two magenta screens when there may be slight misregistration and/or slight screen angle difference between the two screens. To accomplish this, one can use (a) a stochastic screen on the lighter magenta; (b) use the stochastic screen on the yellow, and use the original yellow screen on the light magenta; (c) use line screens of different angles on the light colors; (d) use a blended texture screen combining a halftone screen and a contone screen, where the light colorant channel begins with a regular halftone screen at the highlight tone region, and it gradually switches to contone-like screen at the midtone coverage.

Figures 6, 8C:
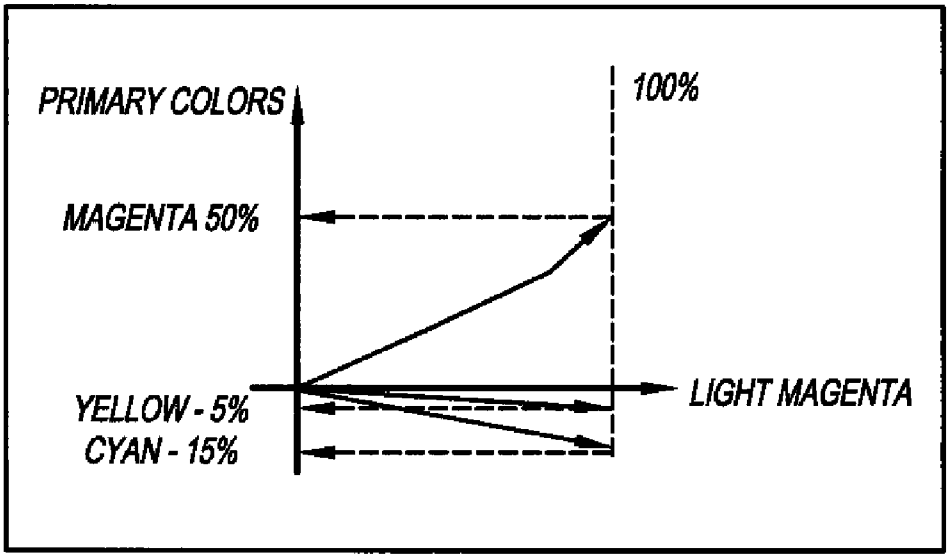
FIG. 6 illustrates one example of unconstrained replacement curves of light magenta.
FIG. 8C illustrates an LUT for a hypothetical color.
Figure 8A:
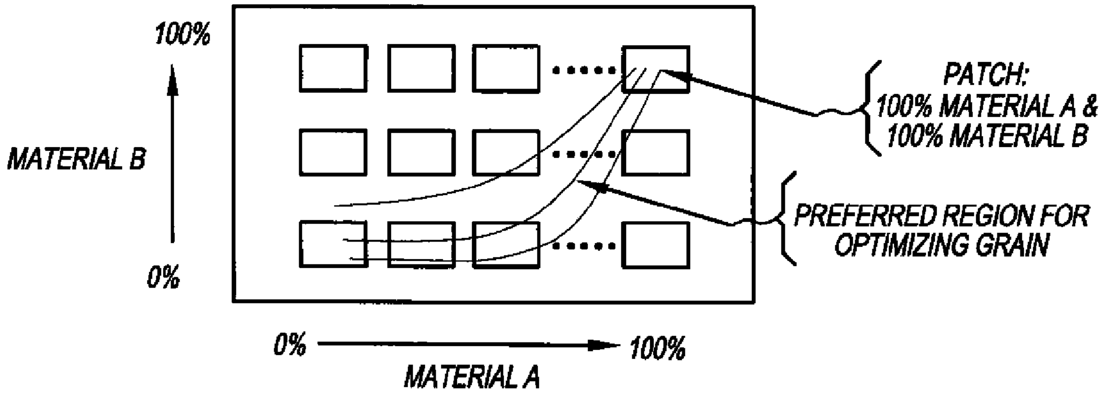
FIG. 8A illustrates the generation of an overprinting map of two similar color materials.
Figure 8B:
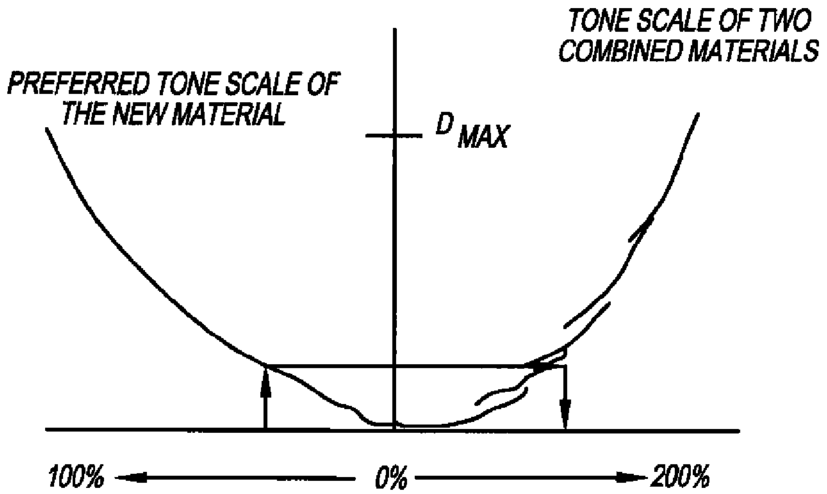
FIG. 8B illustrates the generation of new hypothetical color material with smooth tone scale and optimizing grain reduction.
Figure 9:
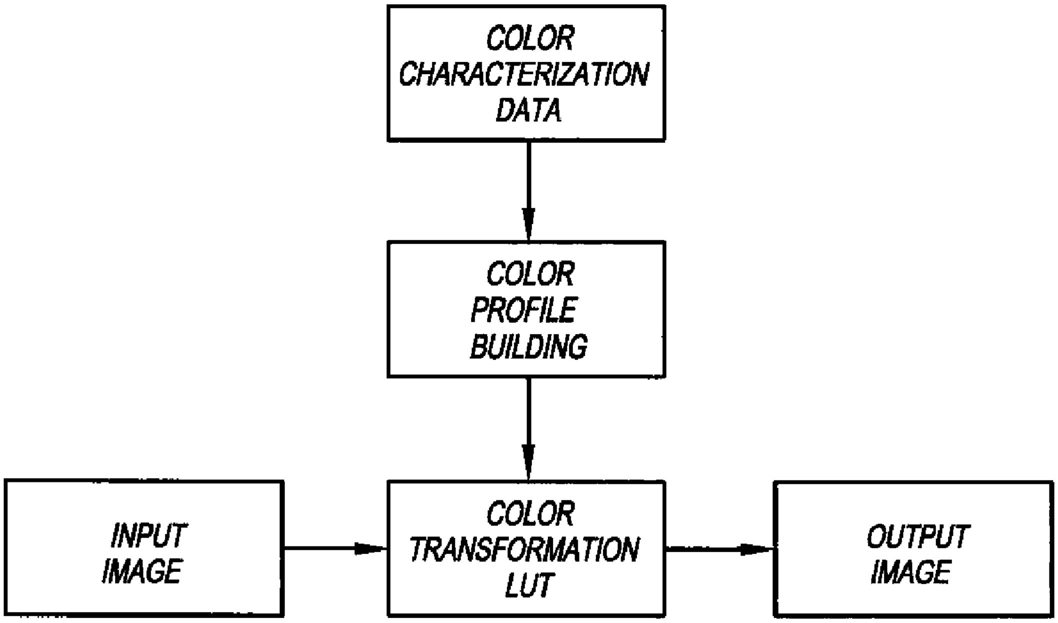
FIG. 9 illustrates a typical color management process.

3) Addressing the color management problem to go to a light and dark magenta at the same time. A typical color management process is illustrated in the FIG. 9. Solutions include (a) build the color profile with a five-color target using light magenta as the 5th color, let the usual color management of the 5th color to separate the output into 5 separation, including one for the light magenta, the other for the darker magenta, and use the usual GCR method (use on the darker magenta in this case to do the mixing), or (b) since we have less control of the blending portion of the light and darker color to reduce grain in the process noted previously, one can create a hypothetical magenta color, i.e. a blend of the lighter magenta and darker magenta, from a printed IT8 target to create the profile for C, hypothetical magenta (HM), Y and K separations. There is a relationship of hypothetical magenta to light and dark magenta, (such as a Look-Up Table (LUT) as illustrated in FIG. 8C), which, then, split out the light (LM) and dark magenta (DM) separation after the hypothetical magenta separation has been generated by the DFE together with C, Y, K separations. For example at the low end of the HM, more of the LM is used and little of the DM is used, so as to reduce grain. As we approach to the mid tone, there is more DM being used. At the higher end, LM is being reduced and DM added to keep the toner mass manageable for fusing and/or other purposes. Creating a hypothetical magenta color (or hybrid magenta color) from light and dark magenta color colorant allows one to appreciate the control of optimizing grain reduction and smooth tone scale in this embodiment. The hypothetical color can be created with any light and dark color of similar hue. An aperiodic micrononuniformity map is generated by overprinting light and dark color patches together with a special layout arrangement as illustrated in FIG. 8A. The trend of grain variation can be visualized from low to high among all the patches. A preferred region on the grain map is identified which optimizes the grain from light to darker density on this hypothetical magenta color. The preferred tone scale of the hypothetical magenta color can then be constructed from the identified preferred region on the grain map as illustrated in FIG. 8B. A LUT is illustrated in FIG. 8C which optimizes the grain by blending light magenta color and dark magenta color along the tone scale.

For different types of applications, such as Photo-rich, it may be desirable to have a five-station configuration of C, M, Y, mid-gray, and light magenta to reduce grainy skin tone and blue sky, more stable neutral, and medium quality black text. Of course, one can add the other colorant on the workflow to get the black text density up. The C, M, Y on this configuration may be optimized for photo application, of which input is mainly RGB. They are not necessarily to be the same colorant as the regular commercial printing, but more suitable for photographic representation. For the commercial printing application, one might want to have C, M, Y, high black (black density of 1.6 to 1.9 reflection) and a light black (reflection density of 0.5 to 0.8 for example), so that neutral stability can be maintained and a higher black density can be achieved at the same time with lower grain.

Since the main contribution of light colorant is to improve the granularity of a printing press, two essential constraints should be imposed in designing a colorant controlling mechanism of a printing system with light colorant capability: maximal color match accuracy and minimal granularity. The current light colorant deployment processes only consider the color matching accuracy as the single criteria with the hope that granularity will improve along the way. The present invention specifically builds in a feedback control to optimize the accurate color match capability, while controlling the resulted granularity lies within a predefined level.

Figure 4:
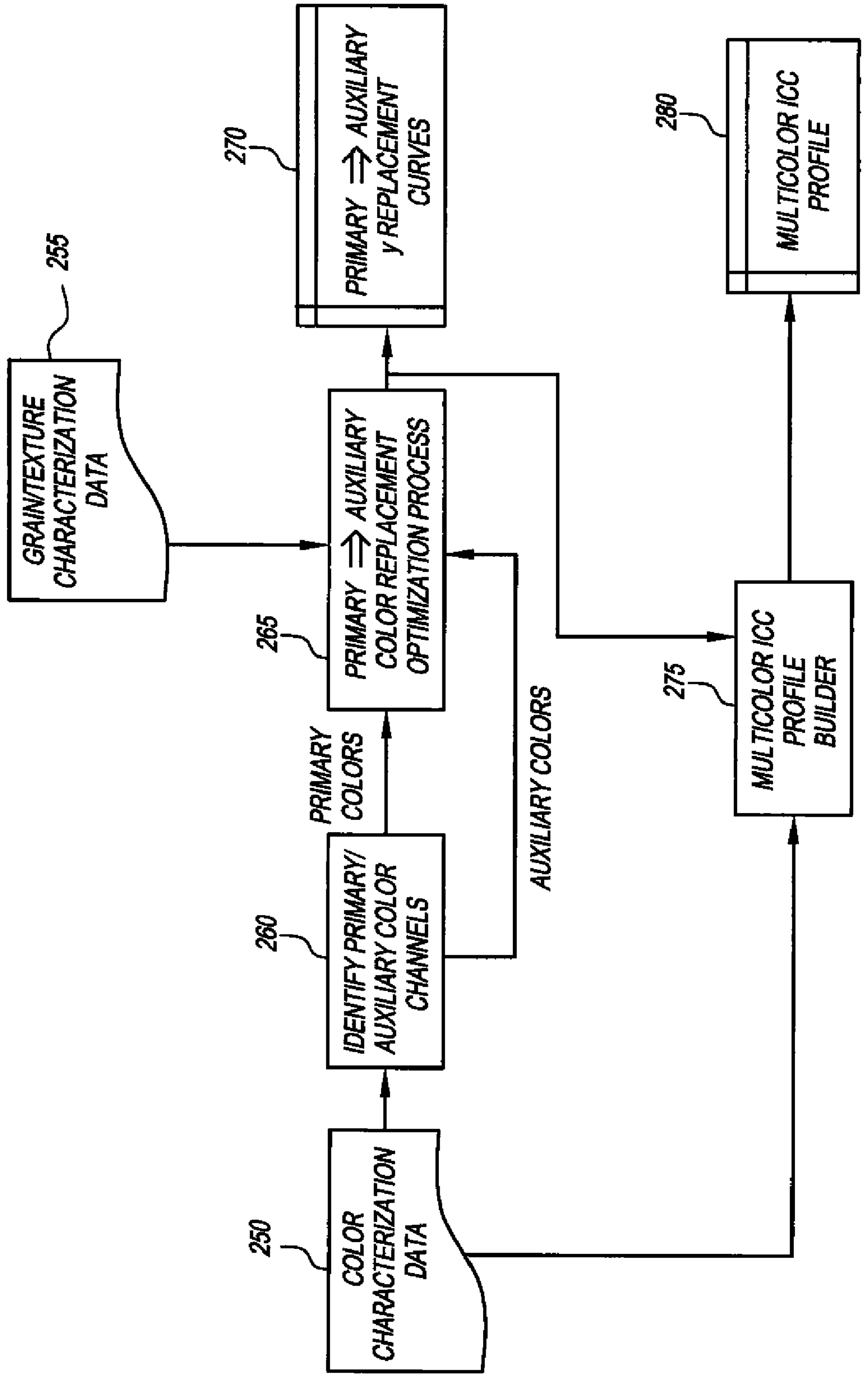
FIG. 4 is a flowchart describing one embodiment of the present invention.
Figure 5:
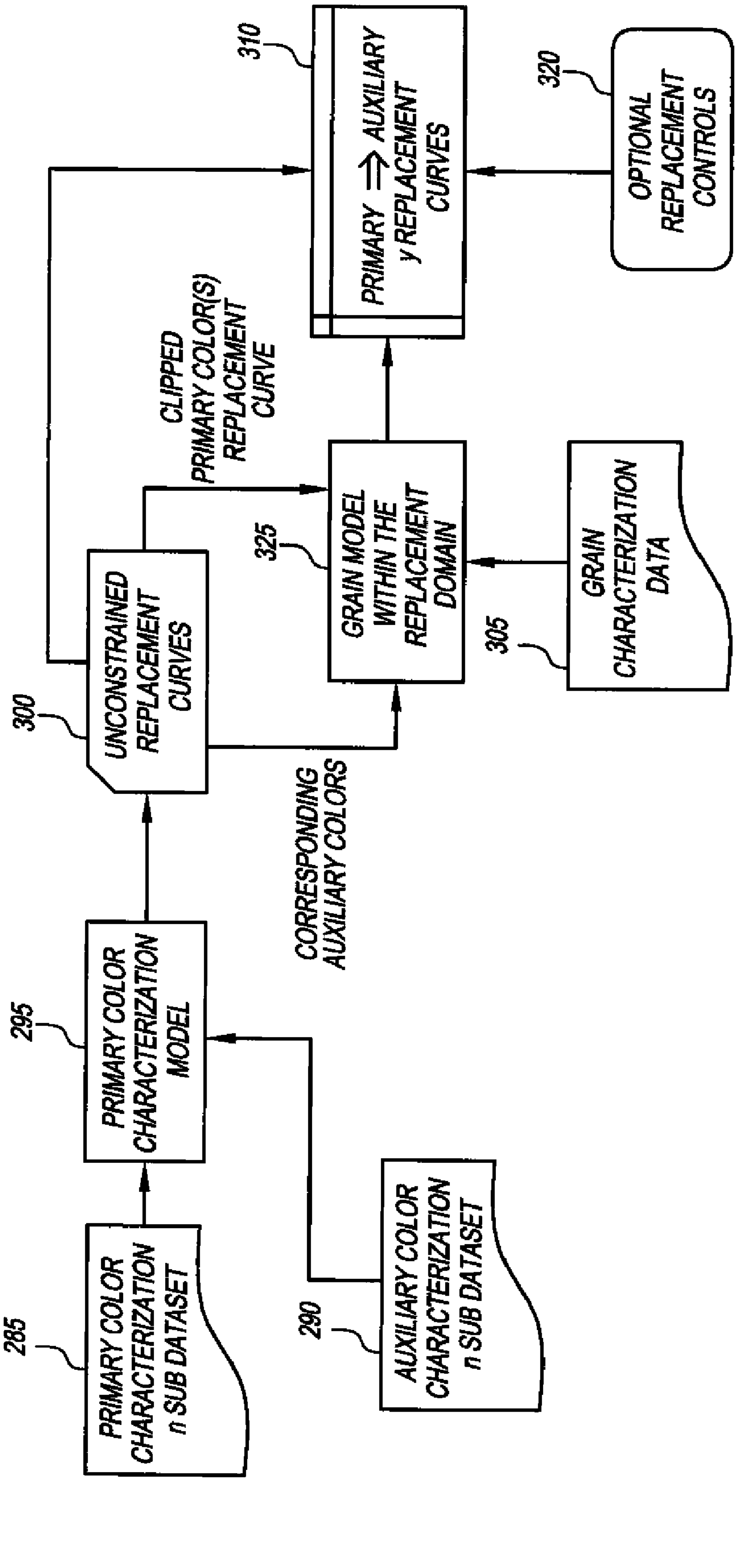
FIG. 5 illustrates the Primary/Auxiliary replacement method regarding how to construct the PCR by optimizing the color matching accuracy while controlling the level of allowable granularity of the printing system.

In another embodiment of blending light colorant and dark colorant to be used in the printing process is illustrated in a more generalized auxiliary light colorant printing process (i.e., ALCP). FIG. 4 summarizes the overall ALCP process where the color characterization data 250 and grain/texture characterization data 255 are acquired a priori. The color characterization data is obtained by measuring the predefined set of color patches composed by the adopted colorants in the ALCP printing process via a spectrophotometer. The grain measuring technique suggested by Kuo et. al. is adopted, but the present invention is not limited to that, to measure the corresponding color graininess. The first step is to classify the color channels into primary color channels and auxiliary color channels 260. In terms of the traditional printing process, cyan, magenta and yellow are designated as the primary color channels. In theory, it is possible to reproduce the color images via only the primary colors except that the consideration of neutral stability and colorant usage efficiency leads to the adoption of extra black channel, which can also be designated as another primary color. The remaining color channel(s) containing light colorant(s) is denoted as the auxiliary color(s). The colorimetric and graininess measurement are both fed into the Primary→Auxiliary Color Replacement Optimization Process 265 as illustrated in FIG. 5. The output of this process is the optimal primary→auxiliary replacement curve(s), which, in turns, can be utilized in two ways:

P1: No multicolor ICC profile is created. The original colorant combination, (C, M, Y, K), is replaced by (C', M', Y', K', A', . . . , $A_n$') based only on the derived replacement curves 270 for each auxiliary color.

P2: The replacement curves are fed into multicolor ICC profile builder 275, and perform Primary Color Removal, PCR, which is similar to the roles of Gray Component Removal, GCR and Under Color Removal, UCR to obtain a multicolor profile 280.

Note that, in the simplistic case where the auxiliary color is the color similar to the primary color with lower pigment concentration, it is safe to assume that the PCR only involves one primary color and one auxiliary color; however, this assumption is not true in general when the pigment in the auxiliary color is not contained in any of the primary colorant, for example, light red colorant or light pink colorant. The present invention addresses this general scenario by allowing the PCR containing any combination of primary color(s).

Figure 7:
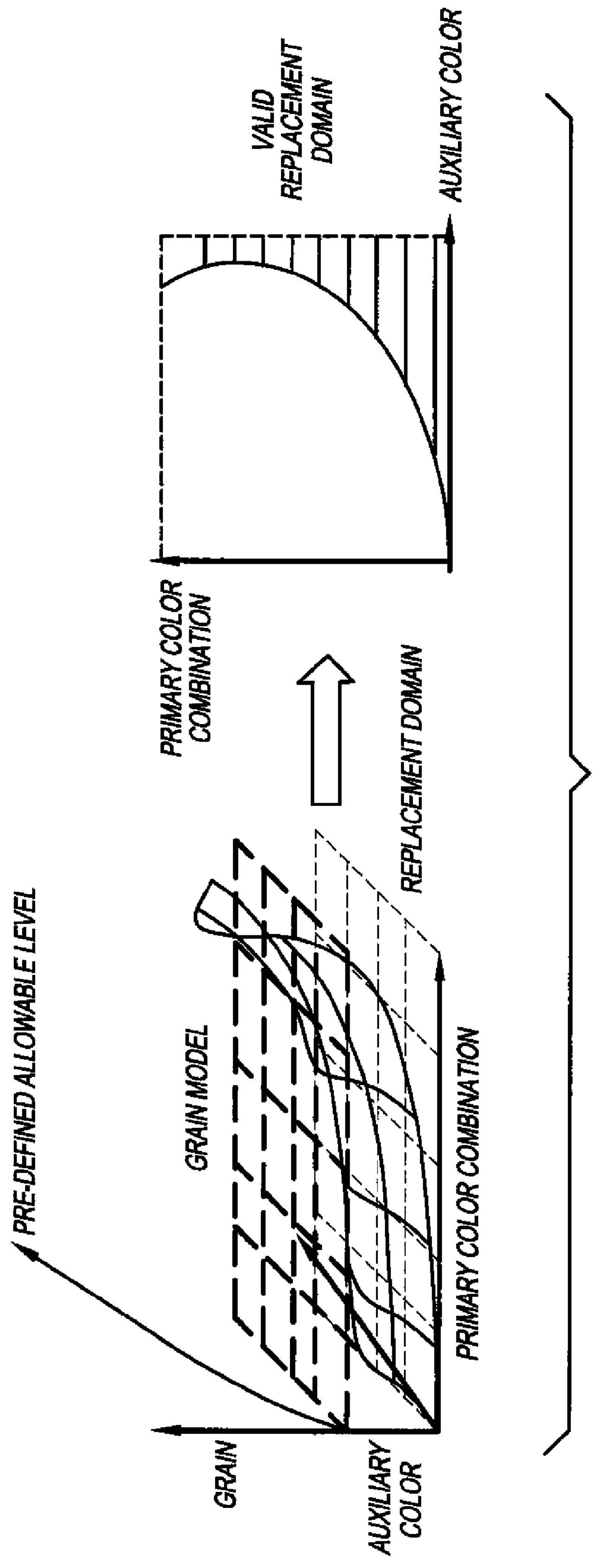
FIG. 7 illustrates the Grain Model and the estimated Valid Replacement Domain, VRD.

FIG. 5 illustrates the Primary/Auxiliary replacement method regarding how to construct the PCR by optimizing the color matching accuracy while controlling the level of allowable granularity of the printing system. At first, the subset of color characterization data pertaining only to the primary colors 285 as well as only the auxiliary color(s) 290 are extracted out into two separate data sets. The following process, Primary Color Characterization Model 295, constructs the mapping relationship between the device color space such as (C, M, Y, K) to a chosen colorspace such as CIELAB. This process is very similar to the regular printer ICC profile building process except that the Primary Color Characterization Model smoothly extends the device (primary) color space beyond the obvious non-negative constraint on the amount of primary colors to imaginary negative values via extrapolation. Various mathematical functions, such as multidimensional spline, multi-variable polynomial, neural networks, etc., can be adopted to achieve this objective. The main reason is that the CIELAB color space spanned by the auxiliary color(s) is usually outside of the color gamut spanned by the primary colors. As a result, it is essential to allow imaginary negative values in the amount of primary colors in order to match the auxiliary color via primary colors in colorimetry. FIG. 6 illustrates an example of a set of unconstrained replacement curves 300, URC, for light magenta, which is substituted by the traditional primary colors, i.e. cyan, magenta, and yellow. Since we can replace the auxiliary color with a set of primary colors defined by URC, and vice versa, this extra degree of freedom allows us to control the granularity level without sacrificing the color gamut and color matching accuracy. We then adopt the grain model 305 suggested by Kuo et. al. and construct the grain surface within the replacement domain 325, which is a two dimensional closed domain spanned by auxiliary color axis and the corresponding primary color replacement combinations 310. For instance, the sampling points along the light magenta are [0, 10, 20, 30, . . . , 100]; however, since it is impossible to actually render a point with negative amount of colorant, the actual sampling points constructing the replacement domain is clipped at zero from below. As a result, the sampling points along the primary color replacement combination for the light magenta are [(0, 0, 0), (0, 10, 0), (0, 20, 0), . . . , (0, 100, 0)]. The constructed grain surface within the replacement domain quantifies the capability of the auxiliary color in improving granularity, and it provides a metric to balance between the color matching accuracy and color granularity. The more stringent the requirement on the color granularity, the smaller the allowable replacement domain can be used for color replacement, which, in turns, limits the capability in utilizing the auxiliary color(s) to match color outside of the primary color gamut as well as creating smooth transition from the primary colors to auxiliary colors. By predefining an acceptable color granularity depending on customer requirement or other factors, we can define a Valid Replacement Domain, VRD, as shown in FIG. 7, which plays an active role in limiting the allowable combination of primary→auxiliary replacement curves. It is possible to include other constraints in limiting the choice of possible primary→auxiliary replacement curves such as maximal total percentage coverage and the degree of replacement percentage. For example, it might be desirable to replace as much primary colors as possible, or only a fraction of them to achieve smoother color transition. This can be input to the primary→auxiliary replacement operation 320 as shown at the optional replacement control in FIG. 5.

The invention has been described in detail with particular reference to certain preferred embodiments thereof, but it will be understood that variations and modifications can be effected within the scope of the invention.

PARTS LIST

60 fuser assembly
62 heated fusing roller
64 opposing pressure roller
66 fusing nip
100 electrographic printer apparatus
101 endless transport web
101*a* cleaning station
102 rollers
103 rollers
105 power supply unit
111 photoconductive imaging roller pc1
112 intermediate transfer member roller itm1
113 transfer backup roller tr1
121 tr2
122 tr2
123 tr2
124 coupled corona tack-down chargers
125 coupled corona tack-down chargers
131 tr3
132 tr3
133 tr3
141 tr4
142 tr4
143 tr4
151 tr5
152 tr5
153 tr5
200 printing modules
201 transfer nip
205 imaging cylinder
206 surface
210 primary charging subsystem
215 intermediate transfer member
216 surface
220 exposure subsystem
225 development station subsystem
230 control unit
236 receiver member
237 receiver member
250 color characterization data
255 grain/texture characterization data
260 auxiliary color channels
265 auxiliary color replacement optimization process
270 derived replacement curves

275 multicolor icc profile builder

280 multicolor profile

285 primary colors

295 primary color characterization model

300 set of unconstrained replacement curves

305 model

310 corresponding primary color replacement combinations

320 auxiliary replacement operation

325 replacement domain

The invention claimed is:

1. A method of improving the print quality of an image printed on a receiver by a printer having a plurality of primary colors and one or more auxiliary colors, the method comprising:

providing the printer having the primary and auxiliary colors;

printing a set of color patches for each primary and auxiliary color using the printer;

measuring the color and granularity of each color patch in the set;

mapping the primary colors to each auxiliary color in turn, wherein the amount of each primary color in any mapping can be negative;

selecting a respective valid replacement domain for each auxiliary color using the measured color and granularity values, so that in the valid replacement domain, a first selected amount of one or more of the primary colors is replaced by a second selected amount of the respective auxiliary color, and the granularity of the resulting combination of zero or more primary colors and the respective auxiliary color is below a selected allowable level;

a curve-producing step of producing a respective set of replacement curves for each auxiliary color using the corresponding valid replacement domain, each replacement curve mapping an amount of one or more of the primary colors to amount of one of the auxiliary colors, each mapping being within the valid replacement domain, so that the color error between the primary colors without the auxiliary color and modified primary colors with the auxiliary color is below a selected threshold;

receiving the image; and printing the image on the receiver with granularity below the selected allowable level using the produced replacement curves.

2. The method according to claim 1, wherein:

at least one of the primary colors is a dark color and at least one of the auxiliary colors is a light color;

the printing step further includes printing a plurality of test patches using the printer, each test patch including a selected combination of the light color and the dark color, and measuring the granularity of the printed test patches; and the curve-producing step includes selecting a first plurality of the combinations of the light color toner and the dark color toner based on the measured granularities of the respective printed test patches, wherein each combination in the first plurality has a different density in a selected density range, so that each replacement curve maps an amount of the dark color to an amount of the dark color and an amount of the light color.

3. The method of claim 2, wherein the printer has a light magenta color.

4. The method of claim 2, wherein the printer has a light magenta color and a light cyan color.

5. The method of claim 2, wherein the printer has a light magenta color and a transparent color.

6. The method of claim 2, wherein the printer has a light magenta color and a light black color.

7. The method of claim 2, wherein the first plurality is selected by determining one or more trends of granularity variation among the printed test patches and selecting patches along a trend that includes a selected Dmin and a selected Dmax, and that has granularity everywhere along the trend below a selected acceptable color granularity.

* * * * *